United States Patent [19]
Beall et al.

[11] Patent Number: 5,114,644
[45] Date of Patent: May 19, 1992

[54] FABRICATION OF CORDIERITE BODIES

[75] Inventors: Douglas M. Beall, Corning; Evelyn M. DeLiso, Elmira; Donald L. Guile, Horseheads; Martin J. Murtagh, Trumansburg, all of N.Y.

[73] Assignee: Corning Incorporated, Corning, N.Y.

[21] Appl. No.: 654,528

[22] Filed: Feb. 13, 1991

[51] Int. Cl.$^5$ .............................................. C04B 35/14
[52] U.S. Cl. ..................................... 264/63; 264/66; 501/119
[58] Field of Search ..................................... 264/63, 66

[56] References Cited

U.S. PATENT DOCUMENTS

| | | | |
|---|---|---|---|
| 3,885,977 | 5/1975 | Lachman | 501/128 |
| 4,280,845 | 7/1981 | Matsuhisa et al. | 264/66 |
| 4,434,117 | 2/1984 | Inoguchi | 264/56 |

*Primary Examiner*—James Derrington
*Attorney, Agent, or Firm*—L. Rita Quatrini; Richard N. Wardell

[57] ABSTRACT

A body is disclosed which is at least about 90% by weight cordierite, has a mean pore size of less than about 10.0 microns, and a coefficient of thermal expansion of no greater than about $9.0 \times 10^{-7}$/°C. from about 25° C. to 1000° C. Also disclosed is a method of fabricating the body. Raw materials are selected to form a composition consisting essentially of in percent by weight about 12 to 16 magnesium oxide, about 35 to 41 aluminum oxide, and about 43 to 53 silica. The raw materials are absent of clay and talc. The magnesium oxide is supplied by a magnesium oxide component having an average particle size of no greater than about 15.0 micrometers in diameter. The aluminum oxide is supplied by an aluminum oxide component having an average particle size of no greater than about 8.0 micrometers in diameter. The composition is capable of forming cordierite in the subsequent firing step. The raw materials are blended with an affective amount of vehicle and forming aids to impart plastic formability and green strength thereto and form a plastic mixture. The raw materials are formed into a green body which is dried and fired. The firing is done by heating to a first temperature of about 1000° C. to 1200° C. and thereafter raising the temperature at a rate of less than about 100° C. per hour to a second temperature sufficient to form cordierite, and maintaining the second temperature for a sufficient time to form the cordierite body.

12 Claims, 1 Drawing Sheet

1

FABRICATION OF CORDIERITE BODIES

BACKGROUND OF THE INVENTION

This invention relates to a cordierite body which has a low coefficient of thermal expansion (CTE). The invention relates also to a method for fabricating the body which makes use of a composition of magnesium oxide, aluminum oxide and silica containing material without clay and without talc. More particularly, the body is formed by extrusion. Still more particularly, the body has a honeycomb structure. A cordierite body having a honeycomb structure is especially suitable for but not limited to use as a substrate for a catalytic converter for automobiles.

Extruded cordierite honeycombs are manufactured for use as substrates to support catalytically active components for catalytic converters on automobiles. Use of cordierite is favorable in this application because of its good thermal shock resistance. The thermal shock resistance (TSR) is inversely proportional to the coefficient of thermal expansion. That is, honeycombs with a low thermal expansion have good thermal shock resistance and can survive the wide temperature fluctuations that are encountered in the application.

Up to this time cordierite has been made typically with starting raw materials of clay, talc and alumina. U.S. Pat. No. 3,885,977 relates to extruded honeycombed monolithic fired ceramics made with these raw materials. In this patent it is stated that the orientation of the cordierite crystals in the fired body as measured by the I ratio, comes about because cordierite forms on oriented clay particles which are aligned by the extrusion process resulting in the desired low CTE. Therefore it was believed that the clay was necessary to form low expansion cordierite.

U.S. Pat. No. 4,280,845 relates to cordierite ceramic fabricated from a mixture of magnesia containing material, alumina, and silica raw materials, using clay and talc predominately. The magnesia containing raw material has a particle size of 5-150 microns. Raw material components yielding magnesium oxide, aluminum oxide, and silica without clay or talc are mentioned. However, the coefficient of thermal expansion in these cases is no less than about $10.5 \times 10^{-7}/°$ C. from room temperature to about 1000° C. The lowest CTE cordierite bodies were obtained with batches which contained clay and talc. The firing rate above 1100° C. is high. Therefore it is believed that a complete reaction is not attained. It is well understood that the firing time and temperature must be sufficient to achieve a complete reaction. The results of an incomplete reaction are that the CTE is high due to the presence of phases other than cordierite.

In U.S. Pat. No. 4,434,117 it has been further suggested that the use of a platy talc without clay is a necessary and sufficient condition in order to achieve a cordierite body with a low coefficient of thermal expansion when this platy talc is combined with other non-clay components to obtain the cordierite composition.

SUMMARY OF THE INVENTION

In accordance with one aspect of the invention, there is provided a body which is at least about 90% by weight cordierite, has a mean pore size of less than about 10.0 microns, and a coefficient of thermal expansion of no greater than about $9.0 \times 10^{-7}/°$ C. from about 25° C. to 1000° C.

In accordance with another aspect of the invention, there is provided a the following method of fabricating the body. Raw materials are selected to form a composition consisting essentially of in percent by weight about 12 to 16 magnesium oxide, about 35 to 41 aluminum oxide, and about 43 to 53 silica. The raw materials are absent of clay and talc. The magnesium oxide is supplied by a magnesium oxide component having an average particle size of no greater than about 15.0 micrometers in diameter. The aluminum oxide is supplied by an aluminum oxide component having an average particle size of no greater than about 8.0 micrometers in diameter. The composition is capable of forming cordierite in the subsequent firing step. The raw materials are blended with an effective amount of vehicle and forming aids to impart plastic formability and green strength thereto and form a plastic mixture. The raw materials are formed into a green body which is dried and fired. The firing is done by heating to a first temperature of about 1000° C. to 1200° C. and thereafter raising the temperature at a rate of less than about 100° C. per hour to a second temperature sufficient to form cordierite, and maintaining the second temperature for a sufficient time to form the cordierite body.

DETAILED DESCRIPTION OF THE INVENTION

Figure 1:
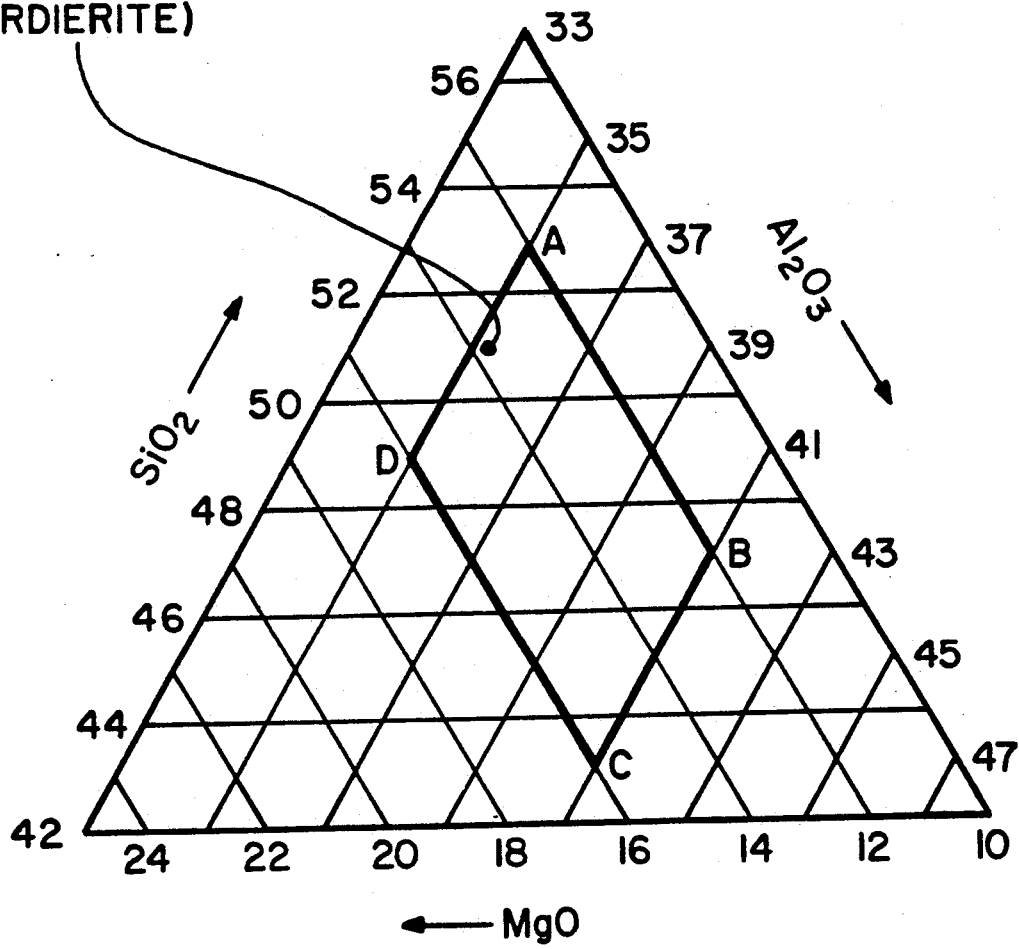
FIG. 1 is a ternary phase diagram of the $SiO_2$-$Al_2O_3$-$MgO$ system showing the region of the raw material compositions of the present invention.

This invention relates to cordierite bodies and to a method for fabricating the bodies which makes use of a composition of magnesium oxide, aluminum oxide and silica containing material without clay and without talc. According to the present invention clay and talc are taken to mean clay and talc as is, or their calcined equivalents, that is clays and talc which have had their crystalline water removed, for example, by heating. The body has a low CTE, and is well oriented as measured by the I ratio using x-ray diffraction techniques. The cordierite bodies fabricated by the method of the present invention can have any shape and size convenient for the application. However, in a preferred embodiment, the body has a honeycomb structure which is formed preferably by extrusion. A cordierite body having a honeycomb structure is especially suitable for but not limited to use as a substrate for a catalytic converter for automobiles.

Honeycomb bodies contain open cells which are formed by thin porous intersecting walls. The entirety of the open cells is enclosed by an outer wall which defines the shape of the body. The cells normally extend along the length of the body and occupy the entire length. There can be any number or density of cells. Typically however, honeycombs have transverse cell densities of about 7.75 cells/cm² to about 400 cells/cm² or more with wall thicknesses of about 0.05 mm to about 1.27 mm, although this can vary with the application.

The coefficient of thermal expansion of the cordierite bodies of the present invention is no greater than about $9.0 \times 10^{-7}/°$ C. from about 25° C. to 1000° C.

The raw materials of the present invention are selected to form a composition consisting essentially of in percent by weight about 12 to about 16 magnesium oxide, about 35 to about 41 aluminum oxide and about 43 to about 53 silica. This composition range is shown in FIG. 1 by the area A-B-C-D.

The magnesium oxide, aluminum oxide and silica are supplied by magnesium oxide components, aluminum oxide components and silica components which yield the respective oxides, known in the art as end member oxides which are necessary to form cordierite, upon firing. These components can include hydroxides, carbonates, nitrates, etc. and also intermediate compounds within the ternary system.

The magnesium oxide is supplied by a magnesium oxide yielding component which is typically magnesium oxide, magnesium hydroxide, magnesium carbonate, magnesium nitrate, or combinations of these. The average particle size of the magnesium oxide component is no greater than about 15 micrometers in diameter. The mean particle size measurements described in the present invention are obtained by Microtrac analysis.

The aluminum oxide is supplied by an aluminum oxide yielding component which can be aluminum oxide, aluminum hydroxide, aluminum nitrate, aluminum carbonate, or combinations of these. The mean particle size of the aluminum oxide component is preferably no greater than about 8 micrometers in diameter. It was found that the particle size affects the CTE of the resulting cordierite body. For example when aluminum oxide is used as the aluminum oxide component having a mean particle size of no greater than about 2 micrometers in diameter, the CTE from about 25° C. to 1000° C. is no greater than about $6.0 \times 10^{-7}/°$ C. When aluminum oxide having a mean particle size of no greater than about 1 micrometer in diameter is used, the CTE from about 25° C. to 1000° C. is no greater than about $4.0 \times 10^{-7}/°$ C. When aluminum hydroxide having a mean particle size of no greater than about 6.0 micrometers in diameter is used, the axial CTE from about 25° C. to 1000° C. is no greater than about $6.0 \times 10^{-7}/°$ C. The CTE's are typically axial CTE's when the bodies are honeycombs.

The silica can be any of the types commercially available. One preferred source of silica is alpha quartz with a median particle size of about 6.0 micrometers in diameter.

Prior to the present invention, at least part of the composition included clay and/or talc as sources of some of the above described component oxides. It was thought that clay was necessary because cordierite forms on oriented clay particles which are aligned by the extrusion process resulting in the desired low CTE. Later it was thought that the use of talc without clay was a necessary and sufficient condition to provide the orientation leading to a low CTE. A distinctive feature of the present invention is that low CTE's are attained when both clay and talc are absent.

Although the composition is relatively pure, some allowance is made for impurities. Impurities within the cordierite body are of concern since they can affect properties such as increasing the CTE. Typically cordierite bodies are affected by impurities such as CaO, $K_2O$, $Na_2O$, $Fe_2O_3$, etc. and can contain a total of about 3.0% by weight impurities. These impurities must be closely controlled. In cordierite bodies of the present invention the ternary end member components are generally synthetic or high purity with a total impurity content of $\leq 0.5\%$ by weight for the final body.

The compositions of the present invention result in formation of cordierite in the subsequent firing step.

The above composition of raw materials is intimately blended with a vehicle and forming aids which impart plastic formability and green strength to the raw materials when they are shaped into a body. When the forming is done by extrusion, the extrusion aids most typically used are methyl cellulose which serves as a binder, and a lubricant such as sodium stearate, although the invention is not limited to these.

The relative amounts of forming aids can vary depending on factors such as the nature and amounts of raw materials used, etc. For example, when ternary end member oxides, that is, aluminum oxide, magnesium oxide and silica, are used the typical amounts of these components are about 2% to about 10% by weight of methyl cellulose and preferably about 3% to about 6%, and about 0.5% to about 1% by weight sodium stearate and preferably about 0.6% by weight. As an example of how the percent levels of forming aids are determined: for a 1000 g batch based on the oxide content, for a 5% by weight level of methyl cellulose, about 50 g of methyl cellulose would be added to the batch, and for a 0.6% by weight level of sodium stearate, about 6 g of sodium stearate would be added.

In accordance with a preferred embodiment, for an extrusion process, the raw material composition and extrusion aids are mixed together in dry form and then mixed with water as the vehicle. The amount of water can vary from one batch of materials to another and therefore is determined by pre-testing the particular batch for extrudability.

The raw materials in the resulting plastic mixture are then formed into a green body. Bodies which have not been sintered are referred to as green bodies. Extrusion techniques are well known in the art. Some examples of preferred techniques will be given in the examples that follow for fabrication of the preferred types of bodies. One preferred structure is a honeycomb structure.

Once the green body is formed it is dried and then fired at a sufficient temperature for a sufficient time to form a cordierite body. The firing is done according to the following schedule. The body is heated from room temperature (approximately 25° C.) to a first temperature of about 1000° C. to about 1200° C. The temperature is then raised from the first temperature to a second temperature at a heating rate of less than about 100° C. per hour. Most typically, however, the heating rate is no greater than about 75° C./hr. It is preferred that the heating rate be no greater than about 50° C./hr, with a heating rate of no greater than about 25° C./hr being especially preferred. The second temperature is sufficient to form cordierite. The second temperature is maintained for a sufficient time to form a body which is at least about 90% by weight cordierite. The second temperature and the length of time maintained at that temperature can vary depending on the specific composition, the design of the equipment, etc. However, typically the second temperature is about 1350° C. to about 1450° C. and it is maintained for typically about 6 to 12 hours.

The body is characterized by a low CTE as discussed previously. The CTE is affected by the type of aluminum oxide component and its particle size as was discussed previously.

The body when formed as a honeycomb structure, for example, by extrusion is further characterized by the I ratio. The I ratio is represented by the formula:

$$I \text{ ratio} = \frac{I_{(110)}}{I_{(110)} + I_{(002)}}$$

where $I_{(110)}$ and $I_{(002)}$ are the peak heights of the reflections from the (110) and (002) planes respectively as described in U.S. Pat. No. 3,885,977. The axial and transverse I ratio measurements refer to different orientations of a honeycomb sample in the x-ray beam. The x-ray beam impinges a planar surface at an angle. Measurements of the transverse I ratio are made when the planar surface of the sample is the flat surface made up of as formed wall surfaces of the honeycomb. Measurements of the axial I ratio are made off a plane which is perpendicular to that for a transverse I ratio where the planar surface on which the x-rays impinge consists of the cross-sectional ends of the honeycomb webs. For a completely randomly oriented cordierite, the I ratio will be about 0.65. If the I ratio measured in the transverse direction with respect to the extrusion direction of the body exceeds about 0.69 or the axial I ratio with respect to the extrusion direction is less than about 0.61, then the cordierite crystallites are becoming substantially oriented with respect to the plane of the webs. A high transverse I ratio, or conversely, a low axial I ratio will yield a low thermal expansion as measured in the extrusion or axial direction. It should be noted that in some cases the thermal expansion can be lower than expected from I ratio alone and this can be due to the influence of microcracking as is well known in the state of the art for aniostropic polycrystalline bodies. The bodies of the present invention have a transverse I ratio of greater than about 0.69, and an axial I ratio of less than about 0.61.

The cordierite bodies of the present invention are characterized by mean pore size of less than about 10 micrometers as measured by mercury porosimetry. The pore size range is suitable to aid the development of microcracking of sufficient size and number to aid the reduction of the CTE. Also it falls in the range for suitable coatability for end use applications.

To more fully illustrate this invention, the following non-limiting example is presented.

Example

Several 1000 g batches of dry powders are made of the components silica, magnesium oxide, and aluminum oxide as raw materials for subsequent formation of a cordierite honeycomb. The raw material batches are each mixed with methyl cellulose as a binder and sodium stearate as a lubricant for the subsequent extrusion operation. The raw material oxides, methyl cellulose and sodium stearate are mixed in a Littleford mixer for about 3 minutes in order to obtain a homogeneous dry blend. The batch is then transferred to a plasticizing mixer such as a muller, sigma blade mixer, etc. and water is added to the dry components in an amount sufficient to form a plasticized batch. The resulting mix is blended for about 10–15 minutes to make a plastic mixture. One inch diameter green honeycomb pieces with a geometry of about 62 cells/cm$^2$ and 0.15 mm wall thickness are extruded using a 25 ton ram extruder. After drying, the green pieces are fired by heating to a temperature of about 1430° C. over a period of about 41 hours and maintaining that temperature for about 10 hours. The properties of the fired bodies are given in Table 2, Batches 1–7 for the various compositions. Batches 1, 2, and 3 are taken from U.S. Pat. No. 4,280,845 for purposes of comparison and are shown in Table 1.

TABLE 1

| | Prior Art Batch No. | | |
|---|---|---|---|
| Description | 1 | 2 | 3 |
| Chemical composition (wt %) | | | |
| MgO | 13.5 | 15.0 | 15.0 |
| Al$_2$O$_3$ | 35.5 | 35.5 | 35.5 |
| SiO$_2$ | 51.0 | 49.5 | 49.5 |
| Magnesium carbonate median particle size μm | 20 | | |
| Magnesium hydroxide median particle size μm | | 27 | 2.1 |
| Aluminum carbonate median particle size μm | 0.5 | 0.5 | 0.5 |
| SiO$_2$ median particle size μm | 0.7 | 0.7 | 0.7 |
| Firing rate °C./hr. above 1100° C. | 100 | 200 | 200 |
| Top temp. and time °C./hr. | 1400-5 | 1350-5 | 1380-5 |
| Properties of cordierite body | | | |
| CTE$_{25-1000}$ ($\times 10^{-7}$)/°C. | 12.7 | 10.5 | 20.1 |
| Pore size, μm | 11 | 25 | 1.5 |

TABLE 2

| | This invention Batch No. | | | | Batch No. | | |
|---|---|---|---|---|---|---|---|
| Description | 1 | 2 | 3 | 4 | 5 | 6 | 7 |
| Chemical composition (wt %) | | | | | | | |
| MgO | 15.0 | 13.8 | 13.8 | 13.8 | 13.8 | 15.0 | 13.8 |
| Al$_2$O$_3$ | 35.5 | 35.1 | 35.1 | 35.0 | 35.1 | 35.5 | 35.1 |
| SiO$_2$ | 49.5 | 51.1 | 51.1 | 51.2 | 51.1 | 49.5 | 51.1 |
| Compounding composition (wt %) (average particle size μm) | | | | | | | |
| Magnesium hydroxide | 17.3 (0.9) | 16.0 (6.5) | 18.8 (6.5) | | | 17.3 (6.5) | |
| Magnesium oxide | | | | 13.8 (0.8) | 13.8 (0.8) | | 13.8 (0.8) |
| Aluminum hydroxide | 43.3 (0.5) | 43.0 (4.6) | | | | 43.3 (4.6) | |
| Aluminum oxide | | | 33.1 (1.8) | 35.1 (0.7) | 35.1 (0.8) | | 35.1 (6.3) |
| Alpha quartz | 39.4 (6.0) | 41.0 (6.0) | 48.1 (6.0) | 51.1 (6.0) | 51.1 (6.0) | | 51.1 (6.0) |
| Amorphous silica | | | | | | 39.4 (0.6) | |
| Firing conditions | | | | | | | |
| Firing rate °C./hr. | 19.3 | 18.3 | 18.3 | 18.3 | 18.3 | 18.3 | 18.3 |

TABLE 2-continued

| Description | This invention Batch No. | | | | Batch No. | | |
|---|---|---|---|---|---|---|---|
| | 1 | 2 | 3 | 4 | 5 | 6 | 7 |
| above 1100° C. | | | | | | | |
| Top temperature and time °C.-hr. | 1380-5 | 1430-10 | 1430-10 | 1430-10 | 1430-10 | 1430-10 | 1430-10 |
| Properties of cordierite body | | | | | | | |
| $CTE_{25-1000}$ ($\times 10^{-7}$)/°C. | 6.9 | 6.8 | 6.4 | 4.1 | 3.3 | 3.8 | 6.1 |
| Transverse I ratio | 0.87 | 0.83 | 0.83 | 0.82 | 0.86 | 0.88 | NA* |
| Pore size, μm | 3.5 | 5.0 | 5.1 | 2.4 | 1.8 | 2.1 | 6.3 |

*NA — data not available

It can be seen that with the compositions of the present invention the CTE's are low. Also the high values of the transverse I ratio indicate a high degree of orientation. It is interesting to note that these results have been achieved without the use of clay or talc in the body. Also these examples demonstrate that low CTE cordierite bodies can be obtained with a number of different combinations of raw materials.

It should be understood that while the present invention has been described in detail with respect to certain illustrative and specific embodiments thereof, it should not be considered limited to such but may be used in other ways without departing from the spirit of the invention and the scope of the appended claims.

What is claimed is:

1. A method of fabricating a cordierite body, said method comprising:
    a) selecting raw materials to form a composition consisting essentially of in percent by weight about 12 to about 16 magnesium oxide, about 35 to about 41 aluminum oxide, about 43 to about 53 silica, said raw materials being absent of clay and absent of talc, said magnesium oxide being supplied by a magnesium oxide yielding component having an average particle size of no greater than about 15.0 micrometers in diameter, said aluminum oxide supplied by an aluminum oxide yielding component having an average particle size no greater than about 8.0 micrometers in diameter, said composition being capable of forming cordierite in the subsequent firing step;
    b) intimately blending said raw materials with an effective amount of vehicle and forming aids to impart plastic formability and green strength to said raw materials and form a plastic mixture;
    c) forming said raw materials into a green body;
    d) drying said green body; and
    e) firing said green body by heating said green body to a first temperature of about 1000° C. to about 1200° C. and thereafter raising the temperature at a heating rate of no greater than about 25° C. per hour to a second temperature sufficient to form cordierite, and maintaining said second temperature for a sufficient time to form a cordierite body of at least about 90% by weight cordierite, said cordierite body having a mean pore size of less than about 10.0 microns, and a coefficient of thermal expansion of no greater than about $9.0 \times 10^{-7}$/° C. from about 25° C. to about 1000° C.

2. A method of claim 1 wherein said magnesium oxide component is selected from the group consisting of magnesium oxide, magnesium hydroxide, magnesium carbonate, magnesium nitrate, and combinations thereof.

3. A method of claim 1 wherein said aluminum oxide component is selected from the group consisting of aluminum oxide, aluminum hydroxide, aluminum nitrate, aluminum carbonate, and combinations thereof.

4. A method of claim 3 wherein said aluminum oxide component is aluminum oxide having a mean particle size of no greater than about 2.0 micrometers in diameter.

5. A method of claim 4 wherein said aluminum oxide has a mean particle size of no greater than about 1 micrometer in diameter.

6. A method of claim 4 wherein said coefficient of thermal expansion is no greater than about $6.0 \times 10^{-7}$/° C. from about 25° C. to about 1000° C.

7. A method of claim 5 wherein said coefficient of thermal expansion is no greater than about $4.0 \times 10^{-7}$/° C. from about 25° C. to about 1000° C.

8. A method of claim 3 wherein said aluminum oxide component is aluminum hydroxide having a mean particle size of no greater than about 6.0 micrometers in diameter.

9. A method of claim 8 wherein said coefficient of thermal expansion is no greater than about $6.0 \times 10^{-7}$/° C. from about 25° C. to about 1000° C.

10. A method of claim 1 wherein said forming is done by extruding said raw materials into said green body.

11. A method of claim 1 wherein said cordierite body has a honeycomb structure.

12. A method of claim 11 wherein the transverse I ratio of said cordierite body is greater than about 0.69 and the axial I ratio is less than about 0.61.

* * * * *

UNITED STATES PATENT AND TRADEMARK OFFICE
CERTIFICATE OF CORRECTION

PATENT NO. : 5,114,644

DATED : May 19, 1992

INVENTOR(S) : Douglas M. Beall, Evelyn M. Deliso, Donald L. Guile, Martin J. Murtagh It is certified that error appears in the above-identified patent and that said Letters Patent is hereby corrected as shown below:

Item [57] Abstract: line 18, "affective" should read -- effective --.

Signed and Sealed this

Twenty-fourth Day of August, 1993

Attest:

BRUCE LEHMAN

Attesting Officer

Commissioner of Patents and Trademarks